(12) United States Patent
Morris (10) Patent No.: US 7,734,890 B2
(45) Date of Patent: Jun. 8, 2010

(54) METHOD AND SYSTEM FOR USING A DISTRIBUTABLE VIRTUAL ADDRESS SPACE

(75) Inventor: Robert P. Morris, Raleigh, NC (US)

(73) Assignee: OkraLabs LLC, Portsmouth, NH (US)

( * ) Notice: Subject to any disclaimer, the term of this patent is extended or adjusted under 35 U.S.C. 154(b) by 107 days.

(21) Appl. No.: 11/539,325

(22) Filed: Oct. 6, 2006

(65) Prior Publication Data

US 2008/0086620 A1 Apr. 10, 2008

(51) Int. Cl.
G06F 12/10 (2006.01)
(52) U.S. Cl. .................. 711/203; 711/202; 711/205; 711/206; 711/207; 717/140; 718/1
(58) Field of Classification Search ......... 711/147–148, 711/200, 202–203, 205–207; 717/136, 140; 718/1
See application file for complete search history.

(56) References Cited

U.S. PATENT DOCUMENTS

| | | | |
|---|---|---|---|
| 4,455,602 A | 6/1984 | Baxter et al. |
| 4,707,781 A | 11/1987 | Sullivan et al. |
| 4,821,184 A | 4/1989 | Clancy et al. |
| 4,853,842 A | 8/1989 | Thatte et al. |
| 4,989,132 A | 1/1991 | Mellender et al. |
| 5,247,679 A | 9/1993 | Kumar |
| 5,317,708 A | 5/1994 | Edgar |
| 5,325,533 A | 6/1994 | McInerney et al. |
| 5,581,697 A | 12/1996 | Gramlich et al. |
| 5,592,625 A | 1/1997 | Sandberg |
| 5,649,139 A | 7/1997 | Weinreb et al. |
| 5,752,031 A | 5/1998 | Cutler et al. |
| 5,829,041 A | 10/1998 | Okamoto et al. |
| 5,835,764 A | 11/1998 | Platt et al. |
| 5,850,554 A | 12/1998 | Carver |
| 5,873,102 A | 2/1999 | Bridge, Jr. et al. |
| 5,873,123 A | 2/1999 | Patel et al. |

(Continued)

FOREIGN PATENT DOCUMENTS

JP 04-206314 7/2004

(Continued)

OTHER PUBLICATIONS

Vlaovic, S., "CC-NUMA Page Table Management and Redundant Linked List Based Cache Coherence Protocol," Department of Computer Engineering, Santa Clara University (Publication Date Unknown).

(Continued)

Primary Examiner—Jasmine Song (57) ABSTRACT

A method and system are disclosed for using a distributable virtual address space. According to an exemplary embodiment, a method for using a distributable virtual address space includes providing a distributable virtual address space shared between a plurality of network nodes, the distributable virtual address space including a virtual address mapped to a first physical memory location of a first network node of the plurality of network nodes, wherein the first physical memory location is accessible by a first processor of the first network node when processing a first machine code instruction using the virtual address. The method also includes remapping the virtual address to a second physical memory location of a second network node of the plurality of network nodes, wherein the second physical memory location is accessible by a second processor of the second network node when processing a second machine code instruction using the virtual address.

43 Claims, 7 Drawing Sheets

U.S. PATENT DOCUMENTS

| | | | |
|---|---|---|---|
| 5,897,634 A | | 4/1999 | Attaluri et al. |
| 5,918,229 A | | 6/1999 | Davis et al. |
| 5,943,283 A | | 8/1999 | Wong et al. |
| 6,006,307 A | | 12/1999 | Cherukuri |
| 6,009,442 A | | 12/1999 | Chen et al. |
| 6,014,710 A | * | 1/2000 | Talluri et al. ............. 709/237 |
| 6,026,474 A | * | 2/2000 | Carter et al. ............. 711/202 |
| 6,067,413 A | | 5/2000 | Gustafsson et al. |
| 6,081,833 A | | 6/2000 | Okamoto et al. |
| 6,148,377 A | * | 11/2000 | Carter et al. ............. 711/147 |
| 6,178,519 B1 | | 1/2001 | Tucker |
| 6,199,141 B1 | | 3/2001 | Weinreb et al. |
| 6,272,597 B1 | | 8/2001 | Fu et al. |
| 6,272,612 B1 | | 8/2001 | Bordaz et al. |
| 6,289,424 B1 | | 9/2001 | Stevens |
| 6,295,584 B1 | | 9/2001 | DeSota et al. |
| 6,298,428 B1 | | 10/2001 | Munroe et al. |
| 6,298,481 B1 | | 10/2001 | Kosaka et al. |
| 6,335,742 B1 | | 1/2002 | Takemoto |
| 6,336,177 B1 | | 1/2002 | Stevens |
| 6,393,545 B1 | | 5/2002 | Long et al. |
| 6,470,360 B1 | | 10/2002 | Vaitheeswaran |
| 6,493,816 B1 | | 12/2002 | Munroe |
| 6,499,095 B1 | | 12/2002 | Sexton et al. |
| 6,549,996 B1 | | 4/2003 | Manry, IV et al. |
| 6,578,129 B1 | | 6/2003 | Da Silva Junior et al. |
| 6,584,507 B1 | | 6/2003 | Bradley et al. |
| 6,591,355 B2 | | 7/2003 | Schuster et al. |
| 6,594,751 B1 | | 7/2003 | Leivent |
| 6,611,955 B1 | | 8/2003 | Logean et al. |
| 6,615,383 B1 | * | 9/2003 | Talluri et al. ............. 714/749 |
| 6,647,474 B2 | | 11/2003 | Yanai et al. |
| 6,667,930 B1 | | 12/2003 | Carlton |
| 6,671,791 B1 | | 12/2003 | McGrath |
| 6,718,485 B1 | | 4/2004 | Reiser |
| 6,721,747 B2 | | 4/2004 | Lipkin |
| 6,792,437 B2 | | 9/2004 | Rafanello |
| 6,804,671 B1 | | 10/2004 | Loaiza et al. |
| 6,826,570 B1 | | 11/2004 | Eshel et al. |
| 6,857,057 B2 | | 2/2005 | Nelson et al. |
| 6,862,608 B2 | | 3/2005 | Buhlman et al. |
| 6,895,491 B2 | | 5/2005 | Kjos et al. |
| 6,898,670 B2 | | 5/2005 | Nahum |
| 6,951,016 B2 | | 9/2005 | Pickett |
| 6,968,398 B2 | * | 11/2005 | Davis et al. ............. 710/3 |
| 7,000,150 B1 | | 2/2006 | Zunino et al. |
| 7,360,204 B2 | | 4/2008 | Bates et al. |
| 2002/0026436 A1 | | 2/2002 | Joory |
| 2002/0026572 A1 | | 2/2002 | Joory |
| 2002/0046224 A1 | | 4/2002 | Bendik |
| 2002/0059259 A1 | | 5/2002 | Cotner et al. |
| 2002/0095663 A1 | | 7/2002 | Joory |
| 2003/0074650 A1 | | 4/2003 | Akgul et al. |
| 2003/0167422 A1 | | 9/2003 | Morrison et al. |
| 2003/0225921 A1 | | 12/2003 | Hostetter et al. |
| 2004/0010498 A1 | | 1/2004 | Lin |
| 2004/0151018 A1 | | 8/2004 | Chen et al. |
| 2004/0187100 A1 | | 9/2004 | Thiruvillamalai |
| 2004/0189695 A1 | | 9/2004 | Kurtz et al. |
| 2004/0221134 A1 | | 11/2004 | Chen et al. |
| 2005/0022157 A1 | | 1/2005 | Brendle et al. |
| 2005/0027757 A1 | | 2/2005 | Kiessig et al. |
| 2005/0044340 A1 | * | 2/2005 | Sheets et al. ............. 711/206 |
| 2005/0081155 A1 | | 4/2005 | Martin et al. |
| 2005/0144360 A1 | | 6/2005 | Bennett et al. |
| 2005/0216552 A1 | * | 9/2005 | Fineberg et al. ............. 709/203 |
| 2006/0067318 A1 | * | 3/2006 | Gorodetsky et al. ............. 370/392 |
| 2007/0169065 A1 | | 7/2007 | Janson et al. |
| 2008/0098378 A1 | | 4/2008 | Kilbane et al. |

OTHER PUBLICATIONS

Bogdanov, A., "RFC 3018—Unified Memory Space Protocol Specification," [online] The Internet Society, Dec. 2000 [retrieved on Nov. 22, 2005] Retrieved from the Internet: <URL: http://www.zvon.org/tmRFC/RFC3018/Output/chapter2.html> (Chapter 2) 5 pages.

Webopedia, "Rom", Feb. 8, 2002, <http://www.webopedia.com/TERM/r/rom>, 3 pages.

Sharif, A., "Cache Memory," [online] Oct. 26, 2004 [retrieved on May 6, 2009] Retrieved from the Internet: <URL: http://searchstorage.techtarget.com/sDefinition/0,,sid5_gci211730,00.html>, 3 pages.

Pyarali, I., et al., "Design And Performance of an Object-Oriented Framework for High-Speed Electronic Medical Imaging," Proceedings of the USENIX 1996 Conference on Object-Oriented Technologies (COOTS) Toronto, Ontario, Canada, Jun. 1996, 25 pages.

"Main Options - Jarte, The Free Word Processor and WordPad Replacement," [online] Jarte [retrieved on Feb. 3, 2006] Retrieved from the Internet: <URL: http://www.jarte.com/help/hs33O.htm> 2 pages.

"RSS Aggregator>Support>Setup Options," [online] Constructive IT Advice [retrieved on Feb. 3, 2006] Retrieved from the Internet: <URL: http://www.seeita.com/RSSA/Setup.shtml>, 2 pages.

Thatte, S., "A Storage Architecture for Object-Oriented Databse Systems," Proceedings of the 1986 International Workshop On Object-Oriented Database Systems, Sep. 23-26, 1986, pp. 148-159 (12 pages).

TekMom's Tech Buzzwords, "RAM vs. Hard Disk," pp. 1-2, May 10, 2000, <URL: http://web.archive.org/web/20000510074154/http://tekmom.com/buzzwords/zdramvhd.html>, 2 pages.

* cited by examiner

METHOD AND SYSTEM FOR USING A DISTRIBUTABLE VIRTUAL ADDRESS SPACE

RELATED APPLICATIONS

This application is related to U.S. patent application Ser. No. 11/428,273, titled "Methods, Systems, And Computer Program Products For Providing A Program Execution Environment, filed on Jun. 30, 2006 and commonly owned by the owner of this application, and U.S. patent application Ser. No. 11/428,338 titled "Methods, Systems, and Computer Program Products for Providing Access to Addressable Entities Using a Non-Sequential Virtual Address Space", filed on Jun. 30, 2006 and commonly owned by the owner of this application, and U.S. patent application Ser. No. 11/428,280, titled "Methods, Systems, And Computer Program Products For Generating And Using Object Modules", filed on Jun. 30, 2006 and commonly owned by the owner of this application, and U.S. patent application Ser. No. 11/428,324, titled "Methods, Systems, and Computer Program Products for Using a Structured Data Storage System to Provide Access to Addressable Entities in Virtual Address Space", filed on Jun. 30, 2006 and commonly owned by the owner of this application, the entire disclosures of which are here incorporated by reference.

TECHNICAL FIELD

The subject matter described herein relates to using a distributable virtual address space in computer systems. More particularly, the subject matter described herein relates to methods, systems, and computer program products for using a distributable virtual address space.

BACKGROUND

Distributed memory systems have been in existence for quite some time. Today's distributed memory systems serve to create a collection of address spaces from a plurality of network nodes which can be shared among the nodes. As a result they are commonly referred to as Distributed Shared Memory (DSM) systems. In a Distributed Shared Memory, multiple nodes share a memory that is physically distributed between many different nodes where one or more of the nodes may additionally have private memory. This allows networked nodes to have access to more memory than they would have access to individually.

One characteristic of today's DSMs is that any given address of the shared address space has a home node. That is, each shared address is fixed to a particular a home node. The home node is the only node that may edit the physical memory location associate with a shared address of a distributed shared address space. For another node to access the shared address, the node must obtain a copy of the area of physical memory associated with the shared address of the home node in order for the node to access the physical memory associated with the shared address.

Within the home node, the shared address may be a virtual address. Computer systems utilize a technology known as virtual memory to provide a processor addressable memory space larger than the available processor physical memory accessible to the microprocessor instruction set. Virtual memory that is active but not currently mapped to a processor physical memory location is stored in a swap space in persistent memory. The size of the swap space is limited, since most of persistent memory is reserved for use by the file system.

Current processor virtual and physical address spaces are sequential in that they are flat, linear, mathematically based address spaces.

While a shared address may be virtual within a home node, it is not virtual with respect to other nodes with which the address is shared. Shared addresses in shared distributed memory systems include a portion, a node/host ID, of the address which identifies the shared address's home node which is a physical location identifier. The node/host ID refers to a specific network node to which the shared address space is fixed for association with a physical memory location of that particular network node. A node accessing a shared address associated with another node is referred to herein as a shared memory client and a node hosting the shared address is referred to as a shared memory server. These terms are relative in that most shared distributed memory systems are used by a set of peer nodes which act in the roles of both shared memory client and shared memory server. A shared memory server owns a shared address, which does not move from the shared memory server. In order to access the physical memory location associated with the shared address, the shared memory client typically caches the contents of the shared memory server's physical memory location associated with the shared address or creates a new copy which doesn't require the current contents in order to access it. When the shared memory client makes edits to the cached copy, those edits must be transferred back to the shared memory server for updating the physical memory location associated with the shared address.

Given that the home ID is not virtualized, distributed shared memory does not support a unified Distributable Virtual Address Space (DVAS). A DVAS includes a collection of virtual addresses that can be dynamically distributed among a plurality of network nodes. That is, the virtual addresses are movable among the nodes allowing a virtual address from the DVAS to be associated with a physical memory location of any node. The nodes can thus transfer the virtual addresses within the DVAS among themselves as required for access improving efficiency and performance.

Accordingly, in light of these difficulties associated with distributed shared memory systems, there exists a need for improved methods, systems, and computer program products for using a distributable virtual address space.

SUMMARY

Accordingly, a method and system are disclosed for using a distributable virtual address space. According to an exemplary embodiment, a method for using a distributable virtual address space includes providing a distributable virtual address space shared between a plurality of network nodes, the distributable virtual address space including a virtual address mapped to a first physical memory location of a first network node of the plurality of network nodes, wherein the first physical memory location is accessible by a first processor of the first network node when processing a first machine code instruction using the virtual address. The method also includes remapping the virtual address to a second physical memory location of a second network node of the plurality of network nodes, wherein the second physical memory location is accessible by a second processor of the second network node when processing a second machine code instruction using the virtual address.

According to another exemplary embodiment, a method for using a distributable virtual address space includes receiving a message including a request for mapping a virtual address to a first physical memory location of a first network node of a plurality of network nodes. The method also includes determining node identification information indicating a second network node of the plurality of network nodes hosting a second physical memory location mapped to the virtual address. The method further includes transmitting a message including mapping information to at least one of the first network node and the second network node, allowing remapping of the virtual address from the second physical memory location of the second network node to the first physical memory location of the first network node.

According to another aspect, a system for using a distributable virtual address space is described. The system includes a first network node of a plurality of network nodes sharing a distributable virtual address space. The first network node includes a first physical memory location mapped to a virtual address in the distributable virtual address space, and a first processor of the first network node having access to the first physical memory location using the virtual address when processing a first machine code instruction of the first network node. The system further includes a second network node of the plurality of network nodes sharing the distributable virtual address space. The second network node includes a second physical memory location capable of being mapped to the virtual address in the distributable virtual address space, a second processor of the second network node having access to the second physical memory location, and a distributable memory manager (DMM) configured to remap the virtual address to the second physical memory location, enabling the second processor to access the second physical memory location using the virtual address when processing a second machine code instruction of the second network node.

According to another exemplary embodiment, a computer program product embodied in a computer-readable medium for using a distributable virtual address space is described. The computer program product includes instructions for receiving a message including a request for mapping a virtual address to a first physical memory location of a first network node of a plurality of network nodes. The computer program product also includes instructions for determining node identification information indicating a second network node of the plurality of network nodes hosting a second physical memory location mapped to the virtual address. The computer program product further includes instructions for transmitting a message including mapping information to at least one of the first network node and the second network node, allowing remapping of the virtual address from the second physical memory location of the second network node to the first physical memory location of the first network node.

BRIEF DESCRIPTION OF THE DRAWINGS

The accompanying drawings provide visual representations which are used to more fully describe the representative embodiments disclosed here and enable those skilled in the art to better understand them and their inherent advantages. In these drawings, like reference numerals identify corresponding elements, and.

DETAILED DESCRIPTION

Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

The term virtual address as used in this document refers to at least a portion of a complete virtual address. Further, a virtual address when associated with a physical memory location, may be associated with locations of varying sizes. Thus a physical memory location associated with a virtual address varies in size from, for example, a single byte to a multi-byte region of physical memory. The association of a virtual address with a physical memory location is referred to as a mapping and is defined in more detail below.

The term map as used in this document refers to a process for associating a virtual address with a physical memory location. A virtual address that has an association to a physical memory location is referred to as mapped or as having a mapping. A virtual address may be mapped to one network node of a plurality of network nodes sharing the virtual address space of the virtual address. The one node is referred to as the mapped network node or mapped node with respect to the virtual address. The virtual address is said to be unmapped with respect to each of the remaining network nodes of the plurality of network nodes. The virtual address is said to be mapped with respect to the plurality of network nodes, The term bind as used in this document refers to a process for associating a virtual address to a network node where the association allows the network node to map the virtual address to a physical memory location of the network node. A virtual address that has been bound to a network node is referred to as bound or having a binding with respect to the network node. In some embodiments the bound network node is required to map the virtual address while other embodiments allow the network node to maintain a binding with an unmapped virtual address. A network node bound to a virtual address is referred to as the bound network node with respect to the virtual address. The virtual address is said to be unbound with respect to each of the remaining network nodes of the plurality of network nodes. The virtual address is said to be bound with respect to the plurality of network nodes. A virtual address which is not bound to any of the network nodes of the plurality is said to be unbound. Note a mapped address is always bound, an unbound address is always unmapped.

The term distributable virtual address space as used in this document is a virtual address space for addressing a virtual memory where a virtual address from the address space may be bound and/or mapped to more than one network node of a plurality of network nodes sharing the distributable virtual address space over a period of time. A virtual address may be bound and/or mapped to one node of the plurality at a time.

The term cached or copied virtual address as used in this document is a virtual address usable by a network node to access a physical memory location of the network node which is a copy of a physical memory location mapped to the virtual address of the virtual addresses bound network node. Distributed shared memory systems support cached and/or copied virtual addresses. Distributed shared memory systems do not enable changing the binding and/or mapping of a virtual address from one network node to another network node. Some embodiments of distributable virtual address spaces also allow cached or copied virtual addresses.

The term mapping information as used in this document refers to any portion of information used by a method for mapping/binding or unmapping/unbinding a virtual address to or from a node. For example, mapping information can include an identifier or address of a node currently mapped/bound to an address, an identifier of the node to which the virtual address is to be mapped bound, information about the results of a map/bind/umap/unbind request, or simply an indicator to a node that it may map/bind/unmap/unbind a virtual address (i.e. a permission).

As used here, a "computer readable medium" can be any means that can contain or store the program for use by or in connection with the instruction execution system, apparatus, or device. The computer readable medium can store in one or more of, for example, but not limited to, an electronic, magnetic, optical, electromagnetic, infrared, or other form. More specific examples (a non-exhaustive list) of the computer readable medium can include the following: a portable computer diskette, a random access memory (RAM), a read only memory (ROM), an erasable programmable read only memory (EPROM or Flash memory), an optical fiber, a portable compact disc (CD), a portable digital video disc (DVD), and the like.

Unless redefined in this document definitions of terms provided in the reference documents provide definitions for matching terms in this document.

Figure 1:
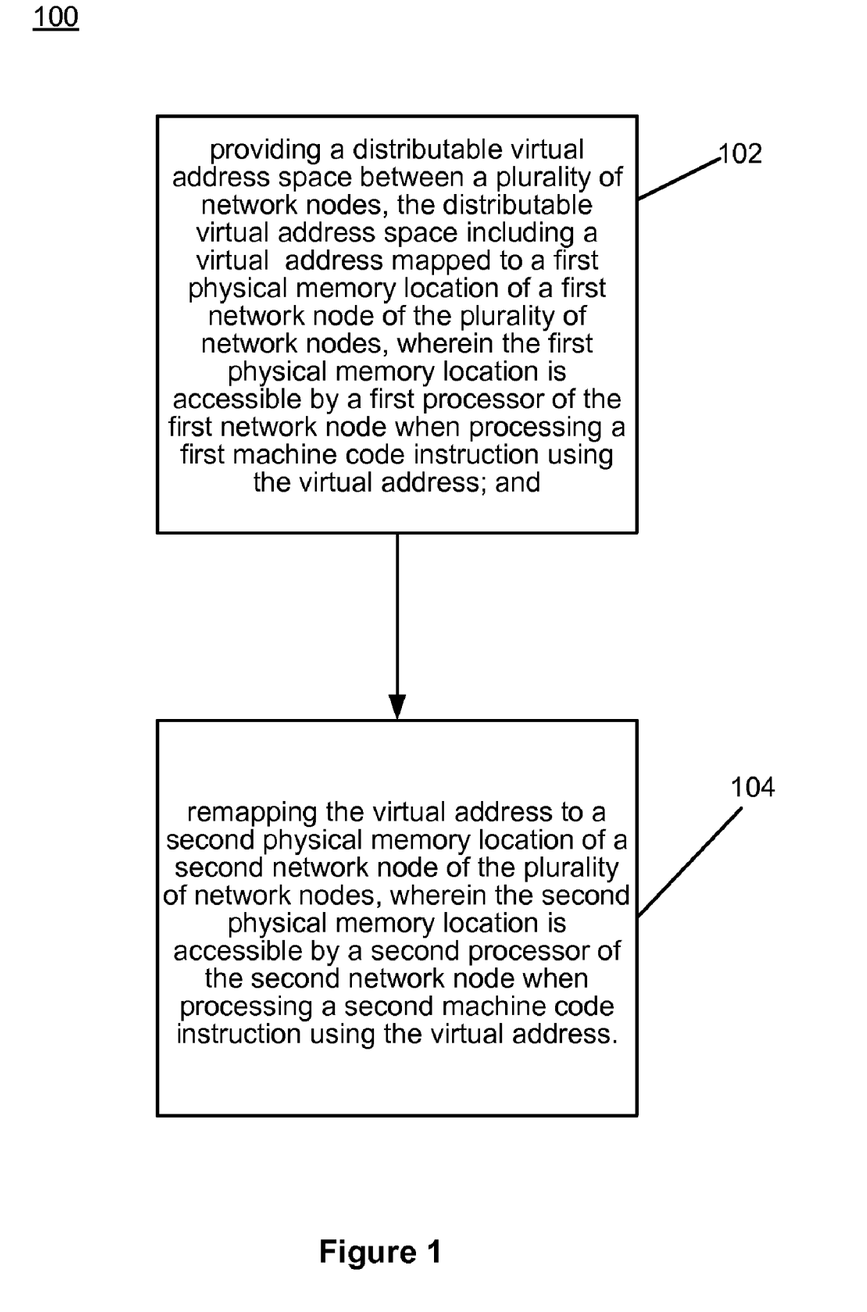
FIG. 1 is a flowchart illustrating an exemplary method for using a distributable virtual address space, according to an exemplary embodiment.

According to one aspect, the subject matter described herein includes a system and method for using a distributable virtual address space. FIG. 1 illustrates an exemplary process 100 for using a distributable virtual address space. At block 102, the process 100 provides a distributable virtual address space shared between a plurality of network nodes, the distributable virtual address space including a virtual address mapped to a first physical memory location of a first network node of the plurality of network nodes, wherein the first physical memory location is accessible by a first processor of the first network node when processing a first machine code instruction using the virtual address.

Figure 2:
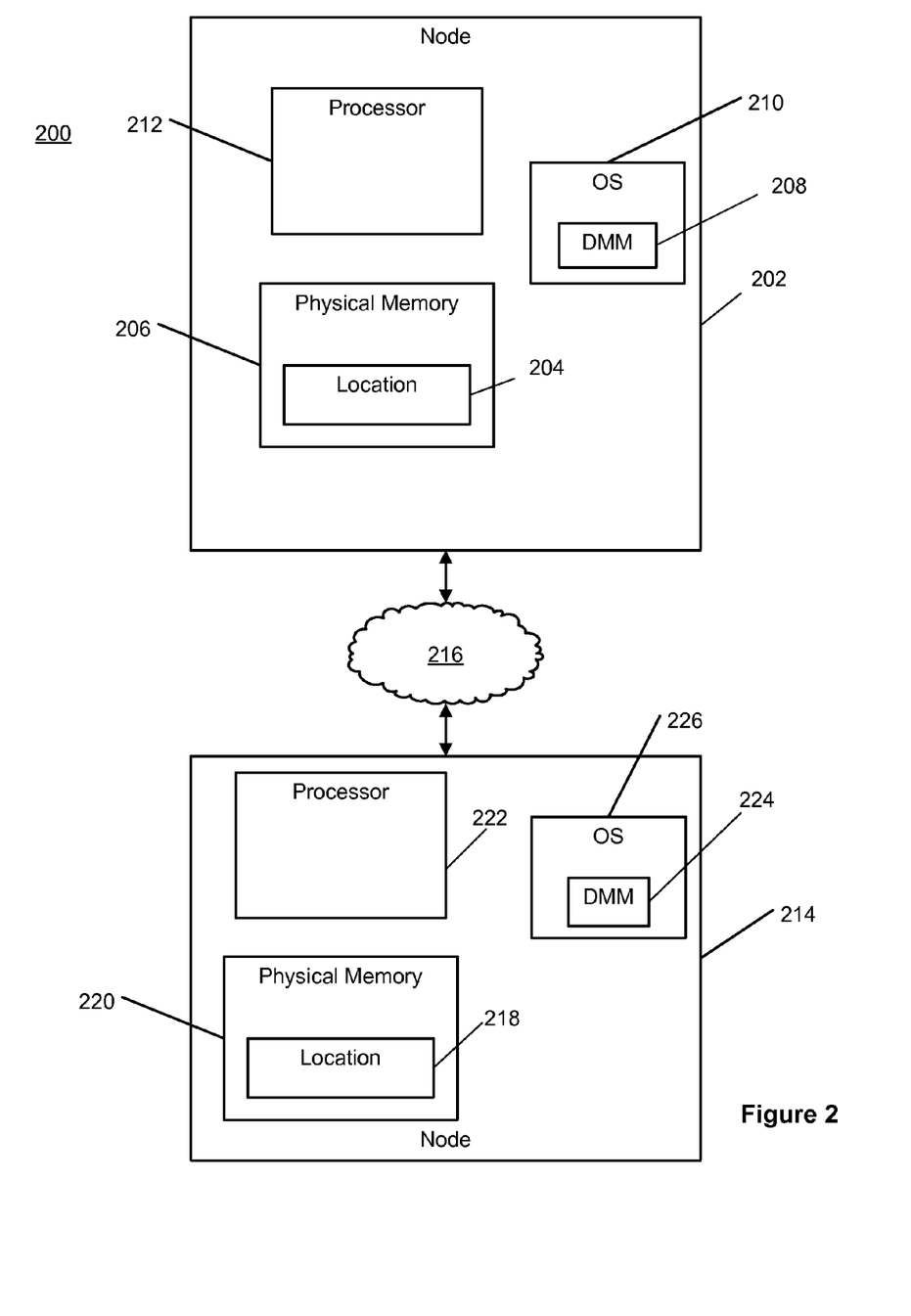
FIG. 2 illustrates an exemplary system for using a distributable virtual address space, according to an exemplary embodiment.

For example, FIG. 2 illustrates an exemplary system 200 for using a distributable virtual address space. In FIG. 2, a first network node 202 of the plurality of network nodes sharing the distributable virtual address space is illustrated. In this embodiment, the first network node 202 includes a first physical memory location 204 in physical memory 206 mapped to a virtual address of the distributable virtual address space by a memory manager referred to as a distributable memory manager (DMM) 208 included within the operating system 210. The first physical memory location 204 is at least one of a random access memory (RAM) location, a read-only memory (ROM) location, and a location in a persistent memory medium. The first network node 202 also includes a first processor 212 having access to the first physical memory location 204 using the virtual address when processing a first machine code instruction on the first network node 202.

Referring again to FIG. 1, at block 104, the process 100 remaps the virtual address to a second physical memory location of a second network node of the plurality of network nodes, wherein the second physical memory location is accessible by a second processor of the second network node when processing a second machine code instruction using the virtual address.

For example, in FIG. 2, the first network node 202 is in communication with a second network node 214. The first network node 202 is in communication with the second network node 214 over a network 216. The second network node 214 of the plurality of network nodes sharing the distributable virtual address space includes a second physical memory location 218 of physical memory 220 to which the virtual address in the distributable virtual address space can be remapped from its current mapping to the first physical memory location 204. Further, a second processor 222 of the second network node 214 has access to the second physical memory location 218. The second network node 214 includes a DMM 224 included with the operating system 226 where, the DMM 224 is configured to remap the virtual address to the second physical memory location 218. The second processor 222 is thus enabled to access the second physical memory location 218 using the virtual address when processing a second machine code instruction on the second network node 214. It should be noted that, in other embodiments, additional nodes are optionally included. In another embodiment, in addition to remapping the virtual address, the content stored in the first physical memory location 204 is relocated to the second memory location 218.

Figure 3A:
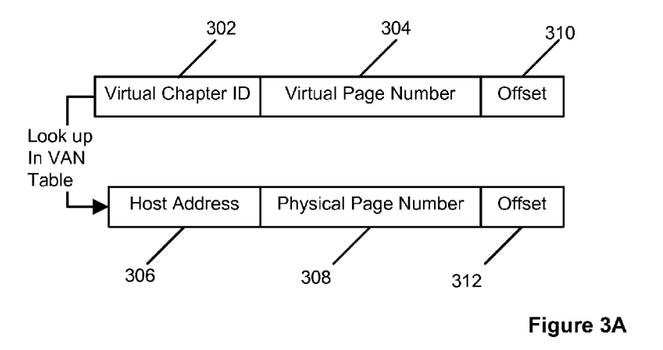
FIG. 3A illustrates an exemplary format of an address from a distributable virtual address space according to an exemplary embodiment.

The virtual address discussed above may be expressed in a variety of formats. FIG. 3A illustrates an exemplary format of a virtual address from a distributable virtual address space (DVAS) and a format of a physical address. In the virtual address format depicted in FIG. 3A a virtual chapter ID 302 is used that is not tied to any particular node in a plurality of network nodes sharing a distributable virtual address space. In some embodiments, the virtual chapter ID 302 directly corresponds to a host address 306. For example, the virtual chapter ID 302 is mapped directly to the host address 306 in the example shown. A virtual page number 304 is mapped to a physical page number 308. Finally, the offset 310 is mapped to the offset 312, or in some embodiments the offset 310 is used as both the virtual and physical offset as with current virtual memory systems.

In another format embodiment, a combination of the virtual chapter ID 302 with another portion of the virtual address, such as at least a portion of the virtual page number 304 for example, corresponds to the host address 306. Physical memory locations associated with virtual addresses, in one embodiment, are associated in chunks at the chapterId.pageNumber chunk level. When the chapter ID 302 maps directly to a host, in an embodiment, all virtual addresses associated with a page in a chapter corresponding to the chapter ID are relocated when the chapter is mapped to a different node.

According to an aspect, a more complex mapping is possible as well. In embodiments where the virtual chapter ID 302 is combined with a portion of the virtual page number 304 to determine the host/node to which a virtual address is bound, a page can be physically mapped across 2 or more nodes.

As indicated, a portion of a virtual address is used to associate the virtual address with a node which hosts the virtual address and is referred to as a virtual address mapping (VAM) or a virtual address binding (VAB). A VAM or VAB is typically stored in a region of processor and/or persistent memory referred to as a VAM table or a VAB table, respectively. These tables and their use are described in more detail later in this document.

A virtual address is typically expressed numerically, but may be expressed non-numerically or in a mixed expression including numeric and non-numeric portions in some embodiments Clearly a number of methods exist for mapping the depicted virtual address format to the depicted physical address format. Note that in some embodiments a virtual address from a distributable virtual address space is not mapped directly to a physical memory address. For example, a virtual address of a distributable virtual address space in one embodiment is mapped to an address of virtual address space of a node which is mapped to an address of a physical memory location of the node. That is, a distributable virtual address space may be built upon a conventional virtual address space of a node, which is mapped to physical memory locations creating 3 layers of memory addresses.

Note also that when extended with a physical node id, a virtual address of a node has a format compatible with a distributed shared memory system. That is, a distributable virtual address space may be enabled by layering it over one or more distributed shared memory systems. As opposed to address formats of distributed shared memory systems, a distributable shared address space uses a virtualized network node identifier. Again, a multi-layered address space architecture is used.

Figure 3B:
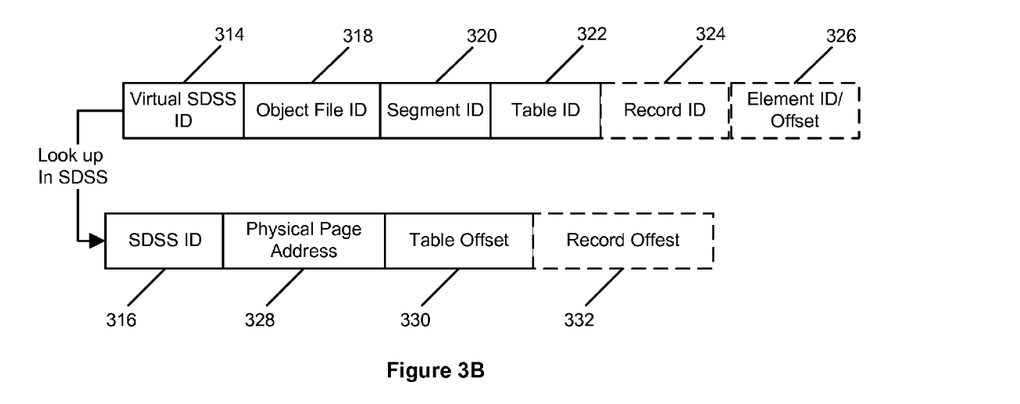
FIG. 3B illustrates an exemplary format of an address from a distributable virtual address space according to an exemplary embodiment.

According to an aspect, the distributable virtual address space is a sequential or a non-sequential distributable virtual address space, and/or is a structured or unstructured virtual address space as defined and enabled in the related applications listed above, the entire disclosures of which are here incorporated by reference, when combined with the teachings herein. To create a non-sequential and/or structured DVAS across a plurality of network nodes, a virtual address is mapped to a structured data storage system (SDSS) node or cluster in one embodiment. FIG. 3B illustrates an exemplary format for a virtual address and also depicts a format for a physical address of an SDSS to which the virtual address mapped. The format of the virtual address includes a virtual SDSS ID 314. This ID 314 is independent of the actual SDSS where the address is physically located (whether the physical memory location is in secondary storage or in memory).

A virtual address in the non-sequential and/or structured distributable virtual address space is one of a variety of address formats compatible with support for a distributable virtual address space. The virtual SDSS ID 314 in some embodiments is combined with a portion of the other elements in the virtual address in the order shown for mapping to an SDSS ID 314. Each additional address element combined with the virtual SDSS ID 314 for mapping to a SDSS ID 316 results in greater flexibility in mapping virtual addresses to physical memory locations just as with the more conventional address format previously described and depicted in FIG. 3A. If a method described in the related applications for enabling a structured and/or non-sequential address space is sup-ported, then once loaded, no relinking of object code is required at the level of the distributable virtual address space.

Figure 4:
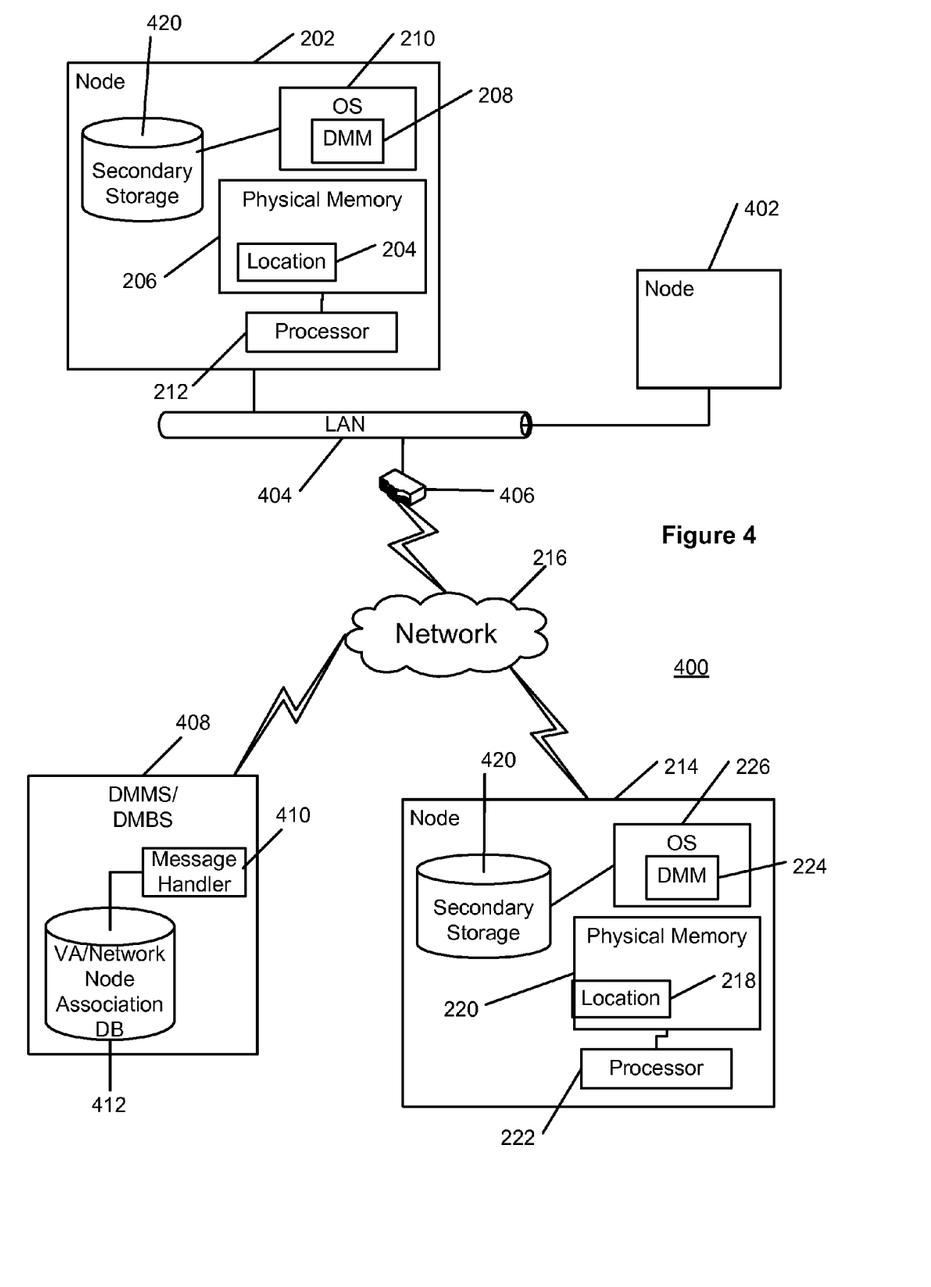
FIG. 4 illustrates an exemplary system for using a distributable virtual address space, according to an exemplary embodiment.

FIG. 4 illustrates an exemplary system 400 using a distributable virtual address space according to an aspect of the invention. A distributable virtual address space spans the devices of a LAN such as the first network node 202 and the third network node 402 coupled to a LAN 404 in system 400 in some embodiments, which is also the typical case for DSM systems. The exemplary system described spans a set of nodes across a WAN such as the Internet depicted as the network 216 and the second network node 214 including any number of LANs depicted as the LAN 404 attached and/or included as a part of the WAN in other embodiments. Note the LAN 404 and the network 216 are connected for communications by a gateway/router 406. For example, in system 400 the second network node 214 requires access to the virtual address. This node is referred to as the mapping and/or binding node in this situation. Further, the virtual address is mapped to the first physical memory location 204 of the first network node 202. In this situation, the first network node 202 is referred to as the mapped and/or bound node.

The system 400 supports an embodiment, which uses a dynamic memory mapping/binding system (DMMS/DMBS) 408 in communication with a plurality of network nodes including the first network node 202, the second network node 214, and the third network node 402. DMMS/DMBS 408 tracks and manages the movement of virtual addresses among the plurality of nodes. A DMMS tracks and/or manages mappings of virtual addresses to physical memory locations of network nodes, and thus implicitly or explicitly tracks bindings of virtual addresses to network nodes. A DMBS tracks and/or manages bindings of virtual addresses to network nodes. A DMBS is simpler since it doesn't deal with mappings, and is the preferred embodiment. The terms will be used together and will be used interchangeably unless the context calls for an embodiment of one or the other specifically.

The DMMS/DMBS 408 in the depicted embodiment is enabled to receive a message including a request to map and/or bind a virtual address. In the example described in an embodiment using a DMMS/DMBS 408, the DMM 224 of the second network node 214 sends a message to the DMMS/DMBS 408 including a request to remap and/or rebind the virtual address from its current mapped physical memory location 204 of the first network node 202. The DMMS/DMBS 408 includes a message handler 410 for processing messages. The message handler 410 receives the message including the map/bind request and identifies the network node mapped and/or bound to the virtual address using a virtual address/network node association database 412, which tracks mappings/bindings between virtual addresses and network nodes. If an association is not found in the virtual address/network node association database 412, the message handler 410 determines that the virtual address is unbound, when unbound virtual addresses are supported by the embodiment. If a virtual address is unbound, the DMMS/DMBS 408 sends a message to the DMM 224 of the second network node 214 where the message includes an indicator that the map/bind request has been granted. The DMMS 408 then receives a message from the second network node 214 including mapping information associated with the virtual address and stores the mapping information in the virtual address/network node association database 412. In an embodiment using the DMBS 408, the message to the second network node 214 granting the binding request does not require the second network node 214 to send mapping information. The DMBS 408 updates the database 412 at the time it sends the message granting the bind request.

In the example being discussed, the DMMS/DMBS 408 determines the virtual address is bound to the first network node 202 and/or mapped to the first physical memory location 204 of the physical memory 206 of the first network node 202. When embodied as a DMMS, the DMMS 408 maintains an association between a virtual address and one of the plurality of network nodes, the association indicating a mapping between the associated virtual address and a physical memory location of the one network node. In one embodiment, the DMMS 408 message handler 410 sends a message to the DMM 208 of the first network node 202 where the message includes a request to disassociate (i.e. unmap and/or unbind) the virtual address from the identified first network node 202 and/or the first physical memory location 204 of the first network node 202 to allow the virtual address to be bound to the second network node 214 and mapped to the second physical memory location 218. If the DMM 208 of the first network node 202 indicates to the DMMS/DMBS 408 that the virtual address has been unmapped/unbound, the DMMS/DMBS 408 sends a message including an indicator granting the second network node's 214 earlier map/bind request. The process proceeds as discussed for unmapped/unbound virtual addresses in the previous paragraph.

In an alternate embodiment, rather than the DMMS/DMBS 408 sending a message to the DMM 208 of the first network node 202 to unmap/unbind the virtual address, the DMMS/DMBS 408 sends a message including address information to the DMM 224 of the second network node 214 enabling the DMM 224 to send a message to the DMM 208 of the first network node 202 including a request to unmap/unbind the virtual address. If the unmap/unbind succeeds, at least one of the DMM 208 of the first network node and the DMM 224 of the second network node 214 sends a message to the DMMS/DMBS 408 including mapping/binding information. This message is received by the message handler 410 which extracts the mapping/binding information and updates one or more associations in the database 412 based on the mapping/binding information received.

Some embodiments allow the unbinding node to refuse or delay processing the unmap/unbind request. In some embodiments the DMMS/DMBS 408 is enabled to anticipate mapping/binding requests, and requests network nodes to map and or bind virtual addresses prior to receiving a request from the associated network nodes. For example, a DMMS/DMBS in one embodiment uses the principal of locality known to those skilled in the art of virtual address space management to anticipate mapping and/or binding. These preemptive requests from the DMMS/DMBS 408 are processed as commands by network nodes in some embodiments and as suggestions that may be refused by network nodes in other embodiments.

Figure 5:
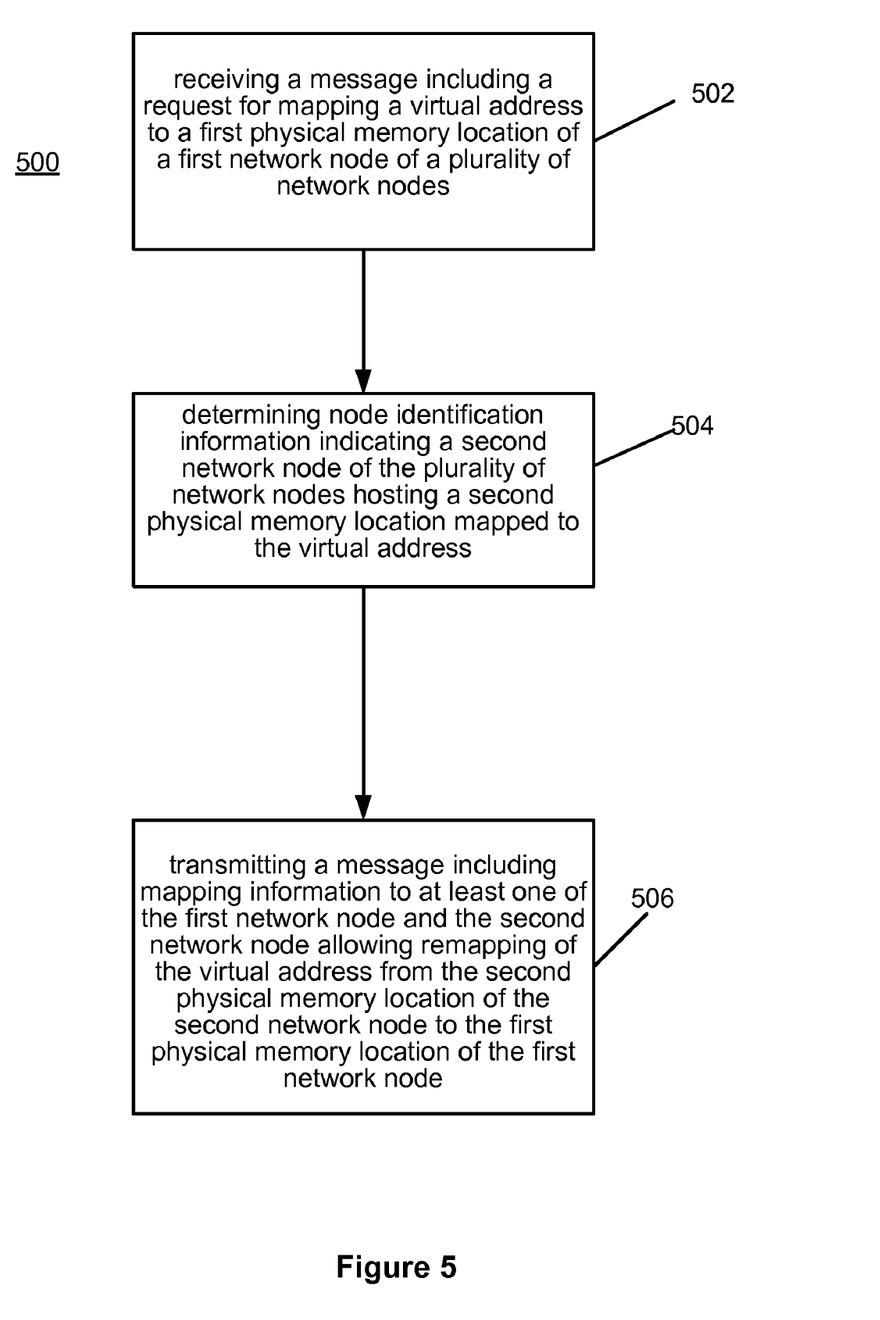
FIG. 5 is a flowchart illustrating an exemplary method for using a distributable virtual address space, according to an exemplary embodiment

According to an aspect, the subject matter described herein includes a method for using a distributable virtual address space shared between a plurality of network nodes. FIG. 5 illustrates a process for using a distributable virtual address space shared between a plurality of network nodes. At block 502 of process 500 a message is received including a request for mapping a virtual address to a first physical memory location of a first network node of the plurality of network nodes. For example, the DMM 208 of the first network node 202 may send a message to the DMMS/DMBS 408 including a request to map/bind the virtual address to the first network node 202. In an alternate embodiment, the message is internally generated by the DMMS/DMBS 408 in anticipation of a possible need for the virtual address by the first network node 202. In yet another embodiment, the message is received from the second network node 214 or one of the other of the plurality of network nodes for the purpose of allocating processing resources efficiently, for example.

At block 504 of process 500 identification information indicating an identified second network node of the plurality of network nodes hosting a physical memory location associated with the virtual address and/or bound to the virtual address is determined. In some embodiments the identification information may be address information identifying a network node.

At block 506 of process 500 a message including mapping information is transmitted to is transmitted to at least one of the first network node and the second network node, allowing remapping the virtual address from the second physical memory location of the second network node to the first physical memory location of the first network node. For example, in one embodiment, the message is transmitted to the DMM 208 of the first network node 202 in system 400. The mapping information identifies the second network node 214 as the mapped network node. The DMM 208 of the first network node 202 sends a message to the DMM 224 to cause the memory management system of the second network node 214 to unmap/unbind the virtual address. The DMM 224, in the embodiment, sends a message to the DMM 208 of the first network node 202 where the message includes an indication that the virtual address may be mapped/bound to the first network node 202. The DMM 208 of the first network node 202, then manages the mapping of the virtual address to the first physical memory location 204 as previously described. At least one of the DMM 208 or the DMM 224 sends a message to the DMMS/DMBS 408 received by the message handler 410 which updates the database 412 based on the new mapping.

In another embodiment, the message transmitted in block 506 of process 500 is transmitted by the DMMS/DMBS 408 to the DMM 224 of the second network node 214, the message including a request for ummapping/unbinding the virtual address from the second network node 214. The DMM 224 umaps/unbinds the virtual address as previously described and in one embodiment sends a message to at least one of the DMM 224 of the first network node 202 and the DMMS/DMBS 408 indicate the virtual address may be mapped/bound to another network node such as the first network node 202. If the message is sent only to the DMMS/DMBS 408, the DMMS/DMBS 408 sends another message to the DMM 208 of the first network node 202 allowing the DMM 208 of the first network node 202 to map/bind the virtual address. If the message from the DMM 208 is sent only to the first network node 202, the DMM 208 of first network node sends a message to the DMMS/DMBS 408 received by the message handler 410 allowing the message handler 410 to update the database 412 with the new mapping information.

The process as illustrated in FIG. 5 can operate as executable instructions of a computer program for using a distributable virtual address space shared between a plurality of network nodes. The instructions can be embodied in any computer readable medium for use by or in connection with an instruction execution system, apparatus, or device, such as a computer based system, processor containing system, or other system that can fetch the instructions from the instruction execution system, apparatus, or device and execute the instructions.

A DMMS/DMBS is not needed for some embodiments for enabling a distributable virtual address space. For example, the previous discussion of the embodiments and examples associated with FIG. 1 and FIG. 2, and described in more detail in the discussion associated with FIG. 6 and FIG. 7 did not use a DMMS/DMBS. According to an aspect not discussed earlier, an alternate embodiment allows a network node to send a map/bind message associated with a virtual address to other network nodes using broadcast messages or a peer-to-peer network protocol. Such embodiments do not need a DMMS/DMBS. In these embodiments, each DMM is responsible for communicating with other DMMs. If an entry for the desired virtual address is not found in a VAM/VAB table by a DMM of a network node the virtual address is assumed to be unmapped/unbound. If an entry is found, the requesting DMM determines the network node with the current mapping/binding or determines the last known network node with a mapping/binding with respect to the requesting network node and sends a map/bind message as described earlier to the determined network node. When a new mapping/binding occurs, in this embodiment, a message including mapping/binding information is sent to allow at least a portion of the plurality of network nodes update a VAM/VAB table via DMMs of the portion receiving the message.

Figure 6:
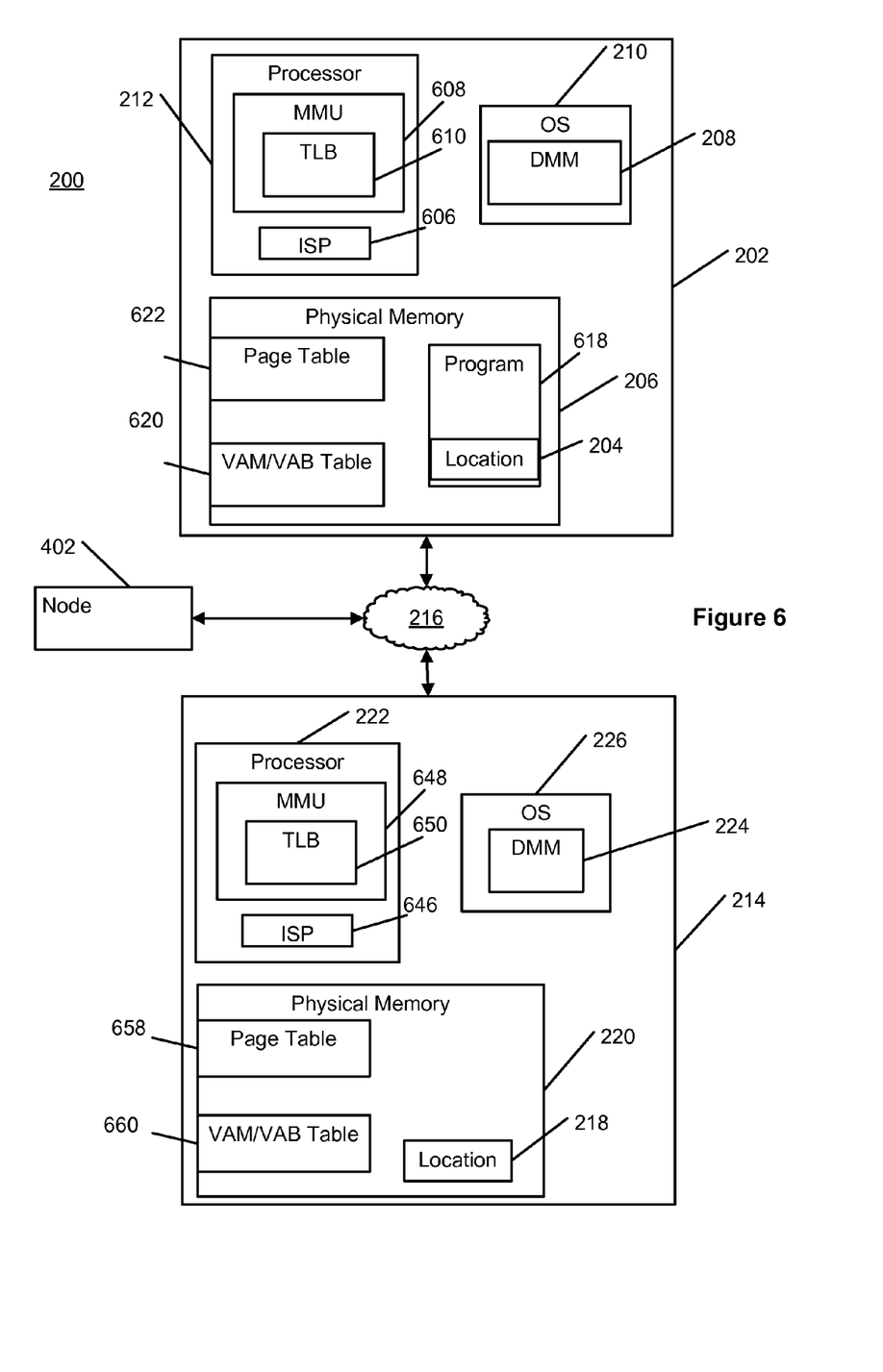
FIG. 6 illustrates an exemplary system for using a distributable virtual address space, according to an exemplary embodiment.

According to another aspect, as FIG. 6 illustrates, the second processor 222 of the second network node 214 includes a second instruction set pointer (ISP) 646 for storing an address of a machine code instruction to process or that is being processed. The second processor 222 uses the ISP 646 in processing a machine code instruction by enabling the second processor 222 to locate and load a machine code instruction from a physical memory location into the second processor 222 for execution. The virtual address mapped to the second physical memory location 218 can be associated with an identifier in the ISP 646 and/or may be an operand or a reference of an operand in the second machine code instruction.

The processor 222 of the second network node 214 further includes a second memory management unit (MMU) 648 as a portion of the second network node's 214 memory management system. The second MMU 648 is adapted to determine whether the virtual address is mapped to a physical memory location in the second main physical memory 220 of the second network node 214. The determination is triggered in processing the second machine code instruction including loading or execution of the second machine code instruction. The second MMU 648 utilizes a second translation lookaside buffer (TLB) 650 to determine whether the virtual address has been processed recently resulting in a record in the TLB 650 mapping the identifier corresponding to the virtual address to a location in the second main physical memory 220. If no mapping associated with the virtual address is located in the second TLB 650, a lookup is performed on a second memory management system component, the page table 658, by the distributable memory manager (DMM) 224. The page table 658 operates in a manner similar to existing page tables by managing an association of a representation of a portion of a virtual address to a physical region of the physical memory 220 or a physical region of the secondary storage (not shown) of the second network node 214 such as a swap file when a local virtual address space underlies the distributable virtual address space.

Some embodiments such as embodiments using a structured and/or non-sequential address space according to a method described in related U.S. patent application Ser. No. 11/428,338 titled "Methods, Systems, and Computer Program Products for Providing Access to Addressable Entities Using a Non-Sequential Virtual Address Space" do not require swap space, so the page table 658 does not reference persistent memory. If no record is located in the page table 658, a map table (not shown) of the second network node 214 is consulted. A map table maintains an association between a representation of a portion of a virtual address with a physical memory location of persistent memory (not shown) such as provided by a hard drive.

If an association in a map table is not located or if the embodiment does not support a map table, the memory management system of the second network node 214, has determined that the virtual address is not mapped to a physical memory location 218 in the physical memory 220 of second network node 214. As a result, the DMM 224 queries the virtual address mapping/binding (VAM/VAB) table 660 to determine which network node of the plurality of network nodes the virtual address is bound and/or mapped to, if any. The distinction between a VAM and a VAB is analogous to the distinction between a DMMS and a DMBS. The virtual address mapping/binding (VAM/VAB) table 660 is stored in a physical memory region 220 of the second network node 214. The VAM/VAB table 660 includes an association between a virtual address and one of the plurality of network nodes including mapping information in the case of a VAM/VAB indicating a mapping/binding between the associated virtual address and the one network node and/or a physical memory location of the one network node, in the case of a VAM. In the example described, the lookup returns a record associating a representation corresponding to the virtual address with address information associated with the first network node 202 indicating the virtual address is mapped/bound to the first network node 202.

If the lookup performed using the second VAM table 660 fails to return address information for a network node, the second distributable memory manager (DMM) 224, in supporting embodiments, interprets the failure as an indication that the virtual address is unbound. This situation is typically an error in embodiments, which do not support unbound virtual addresses. The second distributable memory manager (DMM) 224 causes the second network node 214 to transmit a message causing the first VAM table 620 of the first network node 202 to include a record indicating the virtual address is mapped and/or bound to the second network node 214. Several embodiments were described earlier that achieve this result. If other network nodes are included in the plurality of network nodes sharing the distributable virtual address space, some embodiments send at least a portion of the plurality of network nodes a message informing them of the mapping and/or binding of the virtual address to the second network node 214.

In some embodiments, the transmission of the mapping/binding message by the second network node 214 is interpreted as a request for permission to map and/or bind the virtual address to the second network node 214 by network nodes receiving the mapping/binding message. A network node that already has a mapping/binding record may either unmap and or unbind itself from the virtual address, reject the request, or cause the second network node 214 to wait. The second network node 214 can in some embodiments determine via the second VAM/VAB table 660 that the virtual address is already bound to the second network node 214. An indication that the virtual address is not mapped to a physical memory location of the second network node 214 in the depicted embodiment is determined when lookups to the second TLB 650, the second page table 658, and a map table of the second network node 214, in some embodiments, by processor 222 and DMM 224 all fail to resolve an identifier of the virtual address, and association of the virtual address to the second network node is located in VAM/VAB table 660. In this situation, the second network node 214 is not required to send a mapping/binding message.

In the example described, when the second DMM 224 determines through one of the previously described embodiments that the DMM 224 has authority to bind the virtual address to the node of which it is a component, the DMM 224 causes a mapping/binding record to be created in the second VAM/VAB table 660 mapping/binding the virtual address to the second network node 214. The DMM 224, in this embodiment, updates a map table if the virtual address is mapped to the second physical memory location 218, which is in persistent storage (not shown) of the second network node 214. Typically, however, the DMM 224 maps the virtual address to a location in the second main physical memory 220 and updates the second page table 658 to reflect this mapping in preparation for access by the second processor 222 via the second MMU 648. This allows the second processor 222 to access the second physical memory location 218 using the virtual address now mapped to the second physical memory location 218 in the second main physical memory 220 during the processing of the second machine code instruction by the second processor 222. This access causes the second TLB 650 to be updated with a record associating an identifier corresponding to the virtual address and the second physical memory location 218 in the second main memory 222 to which it is mapped.

As part of the method of binding and/or mapping the virtual address to second network node 214, first network node 202 unmaps (and unbinds in some embodiments) the virtual address from itself in the scenario being described. The first distributable memory manager (DMM) 208 operating in conjunction with the first operating system (OS) 210 receives an indication based on the mapping/binding message it receives to unmap/unbind the virtual address. The DMM 208 unmaps the virtual address from the associated first physical memory location 204 of the first network node 202 by removing any references to the virtual address in the first page table 622 and a map table (not shown) if supported by the first network node 202. The first DMM 208 updates the first VAM table 620, in some embodiments as discussed earlier, to indicate the virtual address is mapped and/or bound to the second network node 214 as supported by the embodiment. In embodiments using a DMMS/DMBS 408, the database 412 is updated as described earlier.

Embodiments which use VAM/VABs in network nodes do not require a DMMS/DMBS as previously stated. Similarly, embodiments that use a DMMS/DMBS do not require VAMs/VABs in network nodes. Embodiments which use both VAMs/VABs and a DMMS/DMBS may be the preferred embodiment in some system. Each of the three classes of embodiments requires different message flows to keep track of and manage mappings/bindings as previous examples have illustrated.

In a scenario using a peer-to-peer embodiment where the network nodes include VAMs/VABs; determining the current mapping/binding of a virtual address requires communication among more than two network nodes. For example, assume that a virtual address had been mapped/bound to the first network node 202, then mapped bound to the third network node 402 where the third network node embodiment includes the use of a VAM/VAB table. In the embodiment, not all network nodes are notified when a new mapping/binding occurs. Rather, each network node that unmaps/unbinds a virtual address from itself, maintains a record in a VAM/TAB table which records the network node it passed the virtual address to. In this case, if the second network node 214 sends a binding request to the first network node 202 possibly because the second network node 214 was mapped/bound to the virtual address just prior to passing it to the first network node 202, the first network node 202 responds to the second network node with a message indicating that the virtual address is mapped/bound to the third network node 402. The second network node 214 then sends a map/bind message to the third network node 402.

In another embodiment, the first network node 202 sends a map/bind message to the third network node 402 in response to receiving a map/bind message from second network node 214. The third network node 402 may send a message directly to the second network node 214 with mapping/binding information associated with the virtual address, or may respond to the first network node 202 which subsequently responds to the second network node 214 with mapping/binding information associated with the request. If the second network node's 214 map/bind request message is granted, the third network node 402 updates its VAM/VAB table (not shown) indicating that the virtual address is mapped/bound to the second network node 214. In embodiments where mapping/binding information is relayed through the first network node 202, the first network node preferably updates its VAM/VAB table 620 indicating the virtual address is mapped/bound to the second network node 214. One can see that both embodiments support sending messages to other DMMs in other network nodes as needed based on the number of times the virtual address been rebound since the second network node 214 was informed of its binding to the first network node 202.

Figure 7:
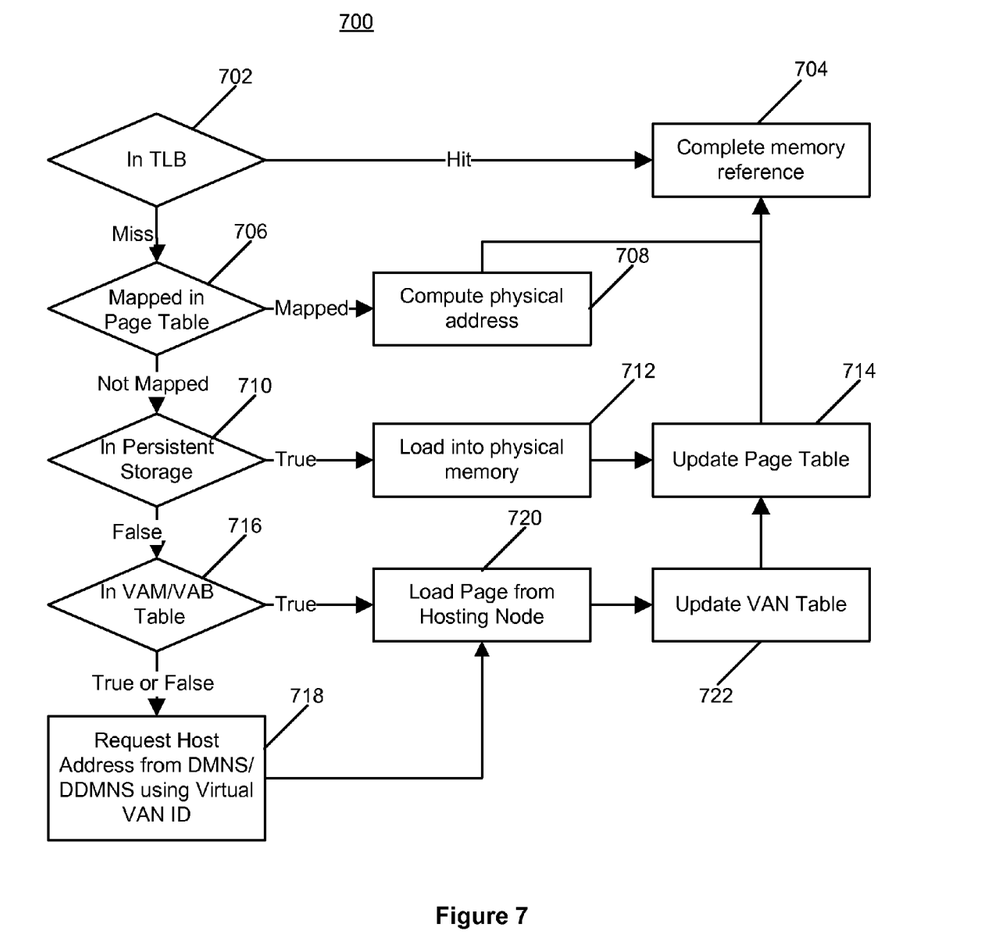
FIG. 7 is a flowchart illustrating an exemplary process for using a distributable virtual address space, according to an exemplary embodiment.

FIG. 7 illustrates an exemplary method for using a distributable virtual address space and will be described in terms of exemplary system 600 in FIG. 6. At block 702, a TLB (a table of recently accessed virtual address regions in memory) 650 is accessed to determine if an identifier associated with a virtual address of a distributable virtual address space is in the TLB 650. If an entry for the identifier is found, the physical address associated with a physical memory location mapped to the virtual address associated with the identifier is made accessible to the processor 222 of the instruction using the virtual address, and the physical memory reference is completed at block 704. If the identifier is not found the process proceeds to block 706

A page table 658 contains representations associated with pages where each page corresponds to a set of virtual addresses such as a region of a sequential virtual address space which is mapped to a region of local physical memory. If a virtual page corresponding to the identifier associated with the virtual address is found in page table 658 at block 706, the physical address corresponding to the physical memory location mapped to the virtual address is computed at block 708 and the memory reference is completed at block 704. If a virtual page corresponding to the virtual address is not found a page fault (an interrupt) is generated and control is passed to the DMM 224 in exemplary system 600 which attempts to locate the virtual page in persistent storage (not shown) at block 710, if the embodiment supports swap space. If the page is found in persistent storage, the page is loaded into the physical memory 220 at the location 218 at block 712 by the DMM 224. The page table 658 is updated at block 714, and the memory reference is completed at block 704.

If the page is not found in persistent storage by the DMM 224, the VAM/VAB table 660 is consulted by the DMM 224 in supporting embodiments to determine whether the local node has processed the virtual address recently and thus has mapping/binding information identifying a network node mapped/bound to the virtual address. If a virtual address entry is found at block 716, the node can make a direct remapping request to the node associated with the virtual address. Rather than using a VAM/VAB table 660 or in addition to using a VAM/VAB table 660, the DMM 224 the requesting node 214 sends a map/bind message to the DMMS/DMBS 408 at block 718. If the virtual address is mapped or bound to the another node it is remapped to the requesting node 214, loaded from the host at block 720, and at least one of the DMM 224 updates VAM/VAB table 660, DMM 208 updates VAM/VAB table 620, and DMMS/DMBS 408 updates database 412 based on the mapping/binding outcome at block 722 and page and/or map tables are updated as required at block 714.

The virtual address described above, in certain embodiments such as the related applications listed above, corresponds to an addressable entity such as those described in the related applications listed above, describing support for structured and/or non-sequential address space, and SDSS backed memory systems.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for using a distributable virtual address space comprising:
providing a distributable virtual address space shared between a plurality of network nodes, the distributable virtual address space including a virtual address mapped to a first physical memory location of a first network node of the plurality of network nodes, wherein the first physical memory location is accessible by a first processor of the first network node when processing a first machine code instruction including the virtual address as an operand of the first machine code instruction; and
remapping the virtual address to a second physical memory location of a second network node of the plurality of network nodes, wherein the second physical memory location is accessible by a second processor of the second network node when processing a second machine code instruction including the virtual address as an operand of the second machine code instruction.

2. The method of claim 1 comprising sending a message including a request for remapping the virtual address to a physical memory location of the second network node.

3. The method of claim 2 wherein the message is sent to a dynamic memory mapping system (DMMS) for maintaining an association between a virtual address and one of the plurality of network nodes, the association indicating a mapping between the associated virtual address and a physical memory location of the one network node.

4. The method of claim 1 comprising sending a message including a request to a dynamic memory mapping system (DMMS) for address information for a network node associated with a virtual address, the network node address information determined from an association maintained by the DMMS indicating a mapping between the associated virtual address and a physical memory location of the network node.

5. The method of claim 4 comprising receiving from the dynamic memory mapping system (DMMS) the address information for the network node having the physical memory location mapped to the associated virtual address.

6. The method of claim 1 comprising sending a message including a request to a dynamic memory mapping system (DMMS) for permission to remap the virtual address to a physical memory location on the network node.

7. The method of claim 1 comprising
providing a memory region for storing an association between a virtual address and one of the plurality of network nodes indicating a mapping between the associated virtual address and a physical memory location of the one network node; and
querying the memory region using an identifier corresponding to the associated virtual address for address information for the network node having the physical memory location mapped to the virtual address using the stored association.

8. The method of claim 1 wherein the physical memory location of each of the first and second nodes includes at least one of a random access memory (RAM) location, a read-only memory (ROM) location, and a location in a secondary memory medium.

9. The method of claim 1 wherein the virtual address corresponds to an addressable entity.

10. The method of claim 1 wherein the distributable virtual address space is at least one of a non-sequential distributable virtual address space and a structured distributable virtual address space.

11. The method of claim 1 comprising detecting an identifier corresponding to the virtual address in processing the first or second machine code instruction.

12. The method of claim 11 wherein processing the first or second machine-code instruction includes determining whether the identifier corresponds to a virtual address from the distributable virtual address space.

13. The method of claim 12 comprising determining the virtual address is mapped to the physical memory location by performing a lookup using the identifier in a region of memory for maintaining a mapping between an identifier corresponding to a virtual address and a physical memory location.

14. The method of claim 1 comprising relocating content stored in the first physical memory location to the second physical memory location.

15. The method of claim 1 comprising sending a message including a request for binding the virtual address to the second network node, wherein binding the virtual address to the second network node reserves the virtual address for use by the second network node for mapping a physical memory location of the second network node to the virtual address.

16. The method of claim 15 wherein the message is sent to a dynamic memory binding system (DMBS) for maintaining an association between the virtual address and the second network node, the association indicating the binding between the virtual address and the second network node.

17. The method of claim 1 comprising sending a message including a request to a dynamic memory binding system (DMBS) for address information for a network node bound to a virtual address, the address information determined from an association maintained by the DMBS indicating that the virtual address is reserved for use by the bound network node for mapping a physical memory location of the bound network node to the virtual address.

18. The method of claim 17 comprising receiving from the dynamic memory binding system (DMBS) the address information for the network node bound to the virtual address.

19. The method of claim 1 comprising
providing a memory region for storing an association between a virtual address and one of the plurality of network nodes indicating a binding between the associated virtual address and the one network node, wherein binding the associated virtual address to the one network node reserves the associated virtual address for use by the one network node for mapping a physical memory location of the one network node to the associated virtual address; and querying the memory region using an identifier corresponding to the associated virtual address for address information for the network node bound to the associated virtual address using the stored association.

20. A method for using a distributable virtual address space comprising:

receiving a message including a request for mapping a virtual address to a first physical memory location of a first network node of a plurality of network nodes, wherein the first physical memory location is accessible by a first processor of the first network node when processing a first machine code instruction including the virtual address as an operand of the machine code instruction;

determining node identification information indicating a second network node of the plurality of network nodes hosting a second physical memory location mapped to the virtual address; and transmitting a message including mapping information to at least one of the first network node and the second network node, allowing remapping of the virtual address from the second physical memory location of the second network node to the first physical memory location of the first network node.

21. The method of claim 20 comprising receiving a message including a request for binding the virtual address to the first network node, wherein binding the virtual address to the first network node reserves the virtual address for use by the first network node for mapping a physical memory location of the first network node to the virtual address.

22. The method of claim 20 comprising:

receiving a message including a request for address information for a network node bound to a virtual address, determining address information from an association indicating that the virtual address is reserved for use by the bound network node for mapping a physical memory location of the bound network node to the virtual address.

23. The method of claim 20 comprising:

providing a memory region for storing an association between a virtual address and one of the plurality of network nodes indicating a binding between the associated virtual address and the one network node, wherein binding the associated virtual address to the one network node reserves the associated virtual address for use by the one network node for mapping a physical memory location of the one network node to the associated virtual address; and querying the memory region using an identifier corresponding to the associated virtual address for address information for the network node bound to the associated virtual address using the stored association.

24. The method of claim 20 wherein the mapping information includes the node identification information allowing the first network node to transmit a message including a request for mapping the virtual address to a first physical memory location of the first to the second network node.

25. The method of claim 20 wherein the mapping information includes an indicator representing that the virtual address is available to be remapped, allowing the first network node to remap the virtual address to a first physical memory location.

26. The method of claim 20 wherein the mapping information includes a request for the second network node to disassociate from the virtual address, allowing the first network node to remap the virtual address to a first physical memory location.

27. A system for using a distributable virtual address space comprising:

a first network node of a plurality of network nodes using a distributable virtual address space, the first network node including:

a first physical memory location mapped to a virtual address in the distributable virtual address space;

a first processor of the first network node having access to the first physical memory location using the virtual address when processing a first machine code instruction including the virtual address as an operand of the first machine code instruction on the first network node; and a second network node of the plurality of network nodes sharing the distributable virtual address space, the second network node comprising:

a second physical memory location capable of being mapped to the virtual address in the distributable virtual address space;

a second processor of the second network node having access to the second physical memory location;

a distributable memory manager (DMM) configured to remap the virtual address to the second physical memory location, wherein the second processor can access the second physical memory location using the virtual address when processing a second machine code instruction including the virtual address as an operand of the second machine code instruction on the second network node.

28. The system of claim 27 wherein the distributable memory manager (DMM) is configured to send a message including a request for remapping the virtual address to a physical memory location of the second network node.

29. The system of claim 28 comprising:

a dynamic memory mapping system (DMMS) in communication with the plurality of network nodes, the DMMS including:

an association between a virtual address and one of the plurality of network nodes including address information of the one network node, the association indicating a mapping between the associated virtual address and a physical memory location of the one network node; and a message handler configured to receive a request for remapping the virtual address to a physical memory location of the second network node.

30. The method of claim 29 wherein the dynamic memory mapping system (DMMS) is configured to determine address information for a network node associated with a virtual address, the address information determined from an association maintained by the DMMS indicating a mapping between the associated virtual address and a physical memory location of the network node.

31. The method of claim 30 wherein the dynamic memory mapping system (DMMS) is configured to send the address information for the network node having the physical memory location mapped to the associated virtual address to the second network node.

32. The system of claim 27 comprising:

a virtual address mapping (VAM) table stored in a memory region of the second network node, the virtual address mapping table including an association between a virtual address and one of the plurality of network nodes indicating a mapping between the associated virtual address and a physical memory location of the one network node; and wherein the distributable memory manager (DMM) is configured to query the VAM table using an identifier corresponding to the associated virtual address for the stored association for address information for the network node having the physical memory location mapped to the virtual address.

33. The system of claim 27 wherein the physical memory location of each of the first and second nodes includes at least one of a random access memory (RAM) location, a read-only memory (ROM) location, and a location in a secondary memory medium.

34. The system of claim 27 wherein the virtual address corresponds to an addressable entity.

35. The system of claim 27 wherein the distributable virtual address space is at least one of a non-sequential distributable virtual address space and a structured distributable virtual address space.

36. The system of claim 27 wherein the second processor of the second network node includes an instruction set pointer (ISP) for storing an identifier corresponding to the virtual address for loading the first or second machine code instruction for execution by the first or second processor.

37. The system of claim 36 wherein the distributable memory manager (DMM) is configured to perform using an identifier corresponding to the virtual address a lookup in a region of memory including a mapping between the identifier and a network node to identify a physical memory location mapped to the virtual address.

38. The system of claim 27 comprising sending a message including a request for binding the virtual address to the second network node, wherein binding the virtual address to the second network node reserves the virtual address for mapping a physical memory location of the second network node to the virtual address.

39. The system of claim 27 comprising a dynamic memory binding system (DMBS) for maintaining an association between the virtual address and the second network node, the association indicating the binding between the virtual address and the second network node.

40. The system of claim 39 wherein the dynamic memory binding system (DMBS) is configured to receive a message including a request for address information for a network node bound to a virtual address and configured to determine the address information from an association maintained by the DMBS indicating that the virtual address is reserved for use by the bound network node for mapping a physical memory location of the bound network node to the virtual address.

41. The system of claim 39 wherein the dynamic memory binding system (DMBS) is configured to send the address information for the network node bound to the virtual address to at least one of the first and second network nodes.

42. The system of claim 39 comprising
a virtual address binding (VAB) table of the dynamic memory binding system (DMBS) including an association between a virtual address and one of the plurality of network nodes indicating a binding between the associated virtual address and the one network node, wherein binding the associated virtual address to the one network node reserves the associated virtual address for mapping a physical memory location of the one network node to the associated virtual address; and wherein the DMBS is configured to query the VAB table using an identifier corresponding to the associated virtual address for address information for the network node bound to the associated virtual address using the stored association.

43. A computer program product embodied in a computer-readable storage medium for using a distributable virtual address space, the computer program product comprising instruction for, when executed by a processor:

receiving a message including a request for mapping a virtual address to a first physical memory location of a first network node of a plurality of network nodes, wherein the first physical memory location is accessible by a first processor of the first network node when processing a first machine code instruction including the virtual address as an operand of the machine code instruction;

determining node identification information indicating a second network node of the plurality of network nodes hosting a second physical memory location mapped to the virtual address; and transmitting a message including mapping information to at least one of the first network node and the second network node, allowing remapping of the virtual address from the second physical memory location of the second network node to the first physical memory location of the first network node.

* * * * *